(12) United States Patent  (10) Patent No.: US 9,106,414 B2
Laves  (45) Date of Patent: Aug. 11, 2015

(54) METHOD AND APPARATUS FOR WIRELESSLY TRANSMITTING HIGH VOLUME CONTENT TO AN ELECTRONIC DEVICE

(75) Inventor: Edward W. Laves, Golden, CO (US)

(73) Assignee: Edward W. Laves, Golden, CO (US)

( * ) Notice: Subject to any disclaimer, the term of this patent is extended or adjusted under 35 U.S.C. 154(b) by 625 days.

(21) Appl. No.: 12/878,727

(22) Filed: Sep. 9, 2010

(65) Prior Publication Data

US 2011/0060669 A1  Mar. 10, 2011

Related U.S. Application Data

(60) Provisional application No. 61/240,895, filed on Sep. 9, 2009.

(51) Int. Cl.

| | |
|---|---|
| G08B 1/08 | (2006.01) |
| H04L 9/08 | (2006.01) |
| G06Q 30/04 | (2012.01) |
| H04H 20/16 | (2008.01) |
| H04H 60/25 | (2008.01) |
| H04H 60/51 | (2008.01) |
| H04H 60/65 | (2008.01) |
| H04H 60/90 | (2008.01) |
| H04L 29/06 | (2006.01) |
| H04H 20/34 | (2008.01) |
| H04H 60/23 | (2008.01) |

(52) U.S. Cl.
CPC .............. *H04L 9/0891* (2013.01); *G06Q 30/04* (2013.01); *H04H 20/16* (2013.01); *H04H 60/25* (2013.01); *H04H 60/51* (2013.01); *H04H 60/65* (2013.01); *H04H 60/90* (2013.01); *H04L 65/4076* (2013.01); *H04H 20/34* (2013.01); *H04H 60/23* (2013.01); *H04L 2209/60* (2013.01); *H04L 2209/80* (2013.01)

(58) Field of Classification Search
CPC ... G06K 1/14; G06K 17/0022; H04B 7/18591
USPC ......... 370/316, 318; 701/438; 705/16, 26, 36; 340/539.3
See application file for complete search history.

(56) References Cited

U.S. PATENT DOCUMENTS

| 3,922,607 A | 11/1975 | Wysong |
|---|---|---|
| 4,379,947 A | 4/1983 | Warner |
| 4,656,440 A | 4/1987 | Gautschi |

(Continued)

*Primary Examiner* — Matthew Gart
*Assistant Examiner* — Rokib Masub
(74) *Attorney, Agent, or Firm* — Marshall, Gerstein & Borun LLP; Randall G. Rueth (57) ABSTRACT

Digital content, particularly high volume digital content, such as newspapers or e-books are transmitted to an electronic device such as a handheld book reader over available bandwidth in a commercial FM radio station, private radio station, television station, or other one-way transmission system. A particular content item may be periodically rebroadcast along with other content on a rotating basis. GPS receivers and location-oriented databases may be used to allow the electronic device to find local broadcast outlets for the digital content when relocated to a new area. When no one-way transmission system is available or when packets of the high volume content are missing, a two-way communication system such as cellular (e.g. 3G or 4G systems), WiFi, WiMax, Bluetooth, etc. may be used to download all or part of the high volume content. Encryption schemes may be used to selectively authorize use of both electronic devices and content.

15 Claims, 7 Drawing Sheets

(56) References Cited

U.S. PATENT DOCUMENTS

| | | |
|---|---|---|
| 4,782,531 A | 11/1988 | Karr et al. |
| 4,928,177 A | 5/1990 | Martinez |
| 4,991,201 A | 2/1991 | Tseng |
| 5,038,402 A | 8/1991 | Robbins |
| 5,063,610 A | 11/1991 | Alwadish |
| 5,070,404 A | 12/1991 | Bullock et al. |
| 5,077,830 A | 12/1991 | Mallia |
| 5,119,503 A | 6/1992 | Mankovitz |
| 5,134,719 A | 7/1992 | Mankovitz |
| 5,241,542 A * | 8/1993 | Natarajan et al. ............. 370/311 |
| 5,266,945 A | 11/1993 | Peek et al. |
| 5,355,161 A | 10/1994 | Bird et al. |
| 5,442,646 A | 8/1995 | Chadwick et al. |
| 5,533,136 A | 7/1996 | Smith |
| 5,606,576 A | 2/1997 | Dapper et al. |
| 5,615,227 A | 3/1997 | Schumacher, Jr. et al. |
| 5,642,397 A | 6/1997 | Agbaje-Anozie |
| 5,790,268 A | 8/1998 | Chomet |
| 5,790,958 A | 8/1998 | McCoy et al. |
| 5,949,796 A | 9/1999 | Kumar |
| 5,987,029 A | 11/1999 | Kotani et al. |
| 6,148,261 A * | 11/2000 | Obradovich et al. ......... 701/438 |
| 6,246,698 B1 | 6/2001 | Kumar |
| 6,374,177 B1 | 4/2002 | Lee et al. |
| 6,397,076 B1 | 5/2002 | Brown et al. |
| 6,452,977 B1 | 9/2002 | Goldston et al. |
| 6,622,007 B2 | 9/2003 | Linden |
| 6,799,201 B1 | 9/2004 | Lee et al. |
| 6,879,996 B1 | 4/2005 | Laves |
| 6,909,702 B2 | 6/2005 | Leung et al. |
| 8,165,519 B2 * | 4/2012 | Sato et al. .................... 455/3.01 |
| 8,351,911 B1 * | 1/2013 | Martin et al. ............... 455/414.2 |
| 2002/0004411 A1 | 1/2002 | Heppe et al. |
| 2003/0058810 A1 * | 3/2003 | Petronic ........................ 370/316 |
| 2005/0094589 A1 * | 5/2005 | Camp .......................... 370/318 |
| 2005/0265550 A1 | 12/2005 | Tuyls et al. |
| 2007/0279315 A1 | 12/2007 | Laves et al. |
| 2007/0282687 A1 | 12/2007 | Laves |
| 2009/0094324 A1 | 4/2009 | Le Chevalier |
| 2009/0125413 A1 | 5/2009 | Le Chevalier et al. |
| 2009/0138924 A1 * | 5/2009 | Eastes .......................... 725/109 |
| 2009/0216892 A1 * | 8/2009 | Grannan et al. .............. 709/229 |

* cited by examiner

METHOD AND APPARATUS FOR WIRELESSLY TRANSMITTING HIGH VOLUME CONTENT TO AN ELECTRONIC DEVICE

CROSS REFERENCE TO RELATED APPLICATION

This application claims the benefit of U.S. Provisional Application No. 61/240,895 filed Sep. 9, 2009, and is incorporated by reference herein in its entirety for all purposes.

TECHNICAL FIELD

The present disclosure relates in general to a method and apparatus for wirelessly and securely delivering large amounts of data inexpensively, reliably and with minimal battery consumption to an electronic display device such as, but not limited to, e-readers, laptop computers, tablet computers, net-books and cell phones, etc. This concept is expected to be particularly useful where transmitted content is voluminous, needs to be delivered frequently, economically, securely and cost effectively with minimal use of battery power by the receiving electronic display device or where cellular networks are not readily available or are too expensive. Examples of likely applications include among others (i) newspapers and magazines, (ii) construction blueprints and documents, (iii) data for field service crews, (iv) military or police maps and information, (iv) medical records and (v) real estate listings.

BACKGROUND

The development of bi-stable plastic displays, and other active e-paper technology, presents the opportunity to produce portable battery powered electronic readers that feature long battery life, a superior reading experience even in bright light and which are almost unbreakable, and are highly water-resistant and lightweight. But the capabilities of this new technology are mitigated by the high cost of delivering fully mobile wireless content to such devices. The apparatus and method disclosed herein overcome this obstacle. Potential market applications, among others, that are expected to benefit from these capabilities include:

Newspapers and Magazines

Newspapers and magazines worldwide are beginning to fail because of competition from the internet and cell-phones both of which offer more content choices and better timeliness. E-readers, such as the Amazon Kindle™ and Sony® Reader, which utilize bi-stable displays can offer the same news content capabilities as cell phones and the internet along with a far superior reading experience. But, their success is being limited by the cost of content transmission and the battery consumption associated with use of cellular networks.

Construction Industry

An ongoing problem for large construction projects is tracking changes and insuring that field crew blueprints are always up to date. The quantity of data to be transmitted is large and cellular radio coverage is sometimes inadequate. Battery life is a critical concern for remote field locations.

Field Service

Repair service personnel frequently require manuals, diagrams and other data in support of their work. The quantity of data required can be substantial and some locations may be outside of cellular data service coverage.

Real Estate

Real Estate agents need up-to-date listing information as they travel with clients to introduce potential properties.

Medical

Electronic Health Records is a pressing national need as medical care consumes ever larger proportions of national GDP. Doctors, emergency medical technicians (EMTs) and other medical professionals would benefit from securely receiving patient records in a timely fashion and being able to view content on large displays encased in pocket size devices. The size of files for medicine can be large, and timely, secure delivery is essential.

Military and Police

Better integration of the individual soldier into the electronic command and control system increases combat effectiveness and reduces casualties. A receive-only system can also reduce the likelihood that radio transmissions might reveal the soldier's location to the enemy.

SUMMARY

In one aspect, the disclosure is directed to a method for wirelessly transmitting large quantities of data to a mobile display device using commercial or privately operated broadcast radio transmitters. In this aspect, the mobile display device is equipped with an inexpensive AM or FM radio receiver with an internal antenna that can receive radio transmissions on designated frequencies. Broadcast time is contracted from commercial broadcast station or a proprietary broadcast system is established to support a specific content delivery requirement. This radio system provides point to multi-point architecture so that all relevant devices within the broadcast coverage area are able to hear the broadcast content. The one-way radio broadcast system may, among other alternatives, utilize all of the capacity of a designated radio channel, may multiplex data content with other content, may utilize sub-carrier capacity or may utilize so called HD digital radio technology. The transmission of content may be on a primary or secondary basis, that is, content delivery may take precedence over other broadcast information or may be transmitted only as bandwidth is available.

In a second aspect, the disclosure is directed to a method by which content is regularly updated during the day and updated content is automatically displayed in the place of the older content.

In a third aspect, the disclosure is directed to a method by which content is encrypted so that only authorized mobile display devices can decrypt the broadcast content. This aspect also includes a one-way authentication system so that access to content can be managed down to the individual mobile display device. Different users can be authorized to receive content selectively and access can be allowed or disallowed as circumstances change.

In a fourth aspect, the disclosure is directed to utilizing a hybrid network that combines broadcast radio with, among other wireless alternatives, cellular, two-way dispatch radio, paging, Wi-Fi®, WiMax™, Bluetooth® and ZigBee® transmitters. Under this aspect of the disclosure, the mobile device and the system will selectively utilize these other wireless networks and network technologies to minimize cost and battery usage while maximizing coverage as well as to allow two-way communications where required and enabling such capabilities as contextual and location based advertising. This aspect includes the use of a compact antenna, such as a multi-band microstrip antenna system.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
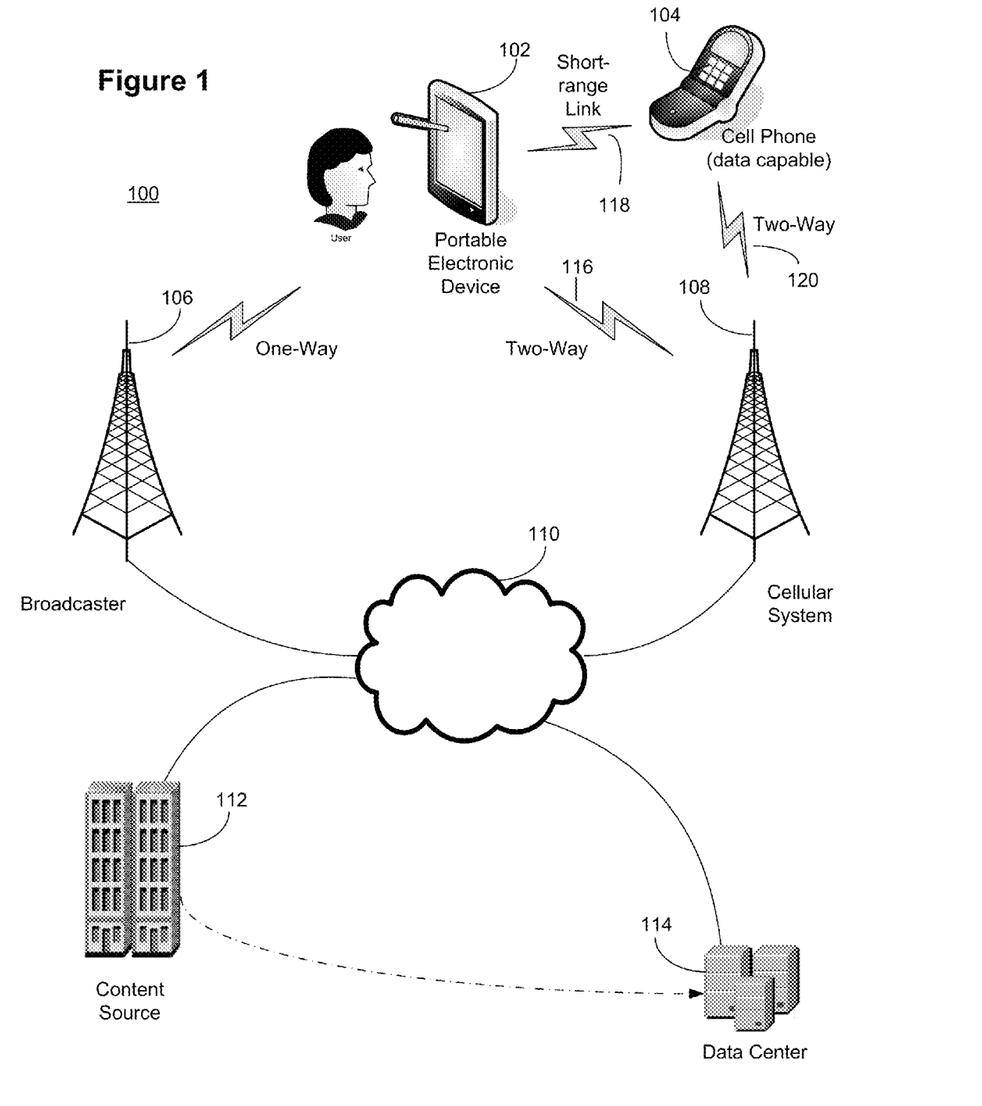
FIG. 1 is an exemplary drawing showing the component of a data transmission system.

FIG. 1 is an exemplary drawing showing some major components of a data transmission system 100. These include a Content Source 112 that, via a communications network 110, such as the internet, sends data to the Data Center 114. The Data Center 114 formats the data for downloading and sends it via the communications network 110 to a broadcaster, for transmission over broadcast backbone 106. At the broadcast backbone 106, the data is transmitted over the air to a Portable Electronic Device 102. The Portable Electronic Device 102 in this illustration can communicate back to the Data Center 114 either directly via one of several two-way backbones using a wireless connection, such as 4G wireless data network 116, or a Cellular Telephone System 108 using connection 120, or alternatively, via a short range connection 118 such as Wi-Fi or Bluetooth to a nearby data capable Cellular Phone 104 which can support bi-directional data transfers from the Portable Electronic Device 102. In this illustration, the Cellular System 108 is connected back to the Data Center 114 via the communications network 110, but other connection paths such as private networks or switched networks are also possible.

Figure 2:
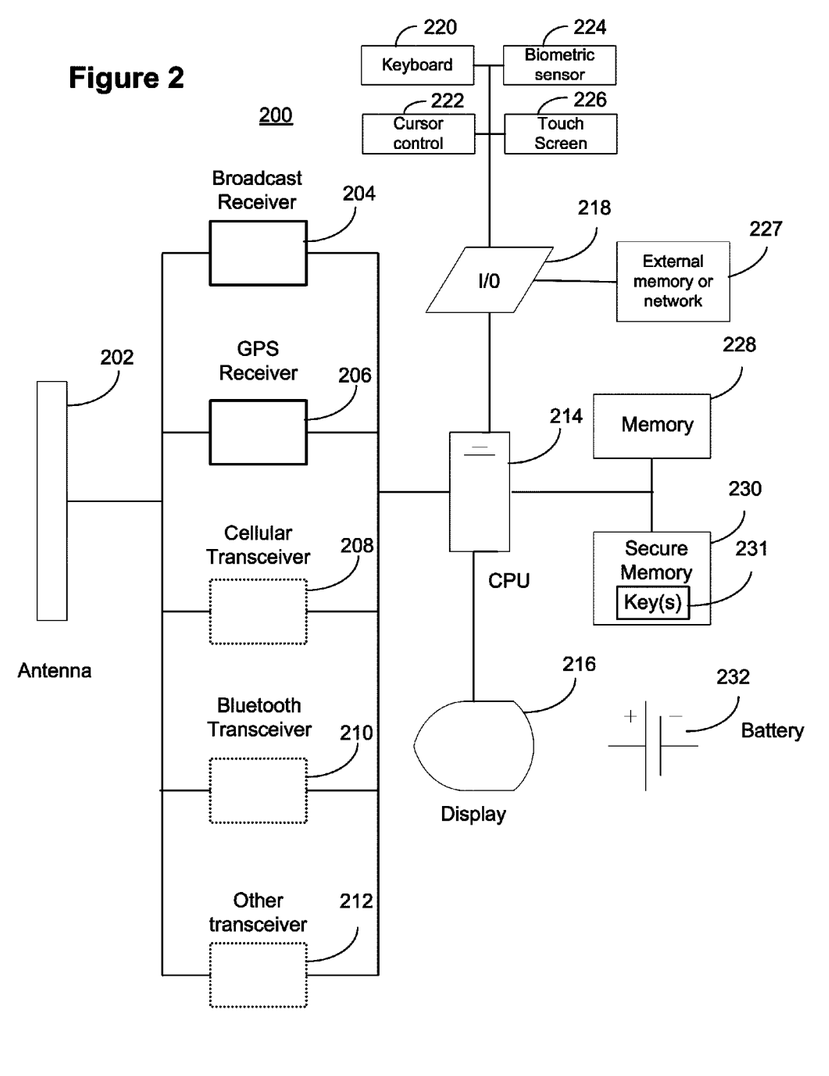
FIG. 2 is an exemplary block diagram drawing showing the components of a Portable Electronic Device.

In another embodiment, the two-way backbone may be a wired connection using, for example, a USB bus connection from the Portable Electronic Device 102 to a wide area network, as shown in FIG. 2.

FIG. 2 is an exemplary block diagram drawing showing the components of a Portable Electronic Device 200. In this example, the Portable Electronic Device 200 includes (i) a CPU 214 that manages the operation of the Device 200, processes data received from one or more of the radio networks 204, 208, 210, or 212, receives input from the I/O 218, displays content on the display 216 and stores items in memory 228; (ii) memory 228, which may include one or more of a flash memory, RAM, ROM, EEPROM, magnetic disk, optical disk, etc., which contains the Device's operating system software, application software, geographic and radio frequency databases, and other data stored there by the CPU 214; (iii) a display 216 on which information is presented to the Device's user; (iv) an I/O 218 supporting both user interface devices and external connections 227, such as a USB device connector. The user interface devices may include, but are not limited to, a keyboard 220, a cursor control device 222, such as a mouse or trackball, a biometric sensor 224, or a touch screen 226. The user interface devices may be used by the user to enter commands and data or for other interaction with the Device 200, such as turning eBook pages or playing a game. The Portable Electronic Device 200 may further include: (v) a Broadcast radio receiver 204 which receives carrier or sub-carrier signals carrying digital content broadcast by the corresponding backbone system's broadcaster; (vi) a GPS receiver 206 which receives signals from several GPS satellites to geographically locate the Device 200; and one or more transceivers, including, but not limited to, (vii) a data capable Cellular Transceiver 208 which receives and transmits data to and from its corresponding backbone system; (viii) a Bluetooth Transceiver which receives and sends data via a nearby cellular telephone and its corresponding backbone system or a router (not depicted); (ix) an antenna system 202, such as a micro stripline antenna system that receives radio signals for all of the aforementioned receivers and for two-way devices, transmits back to the respective backbone systems; (x) a secure memory 230, such as a smart chip or other tamper-resistant storage device, that securely stores private data and information as well as cryptographic keys 231, such as manufacturer keys, device keys, derived keys, and/or public key infrastructure (PKI) private keys, and (xi) a battery 232 that provides electrical energy to power all of the aforementioned components of the Device 200.

An alternative receiver 212, such as a 4G transceiver, WiMax, etc., may also be included. The dashed lines of blocks 208, 210 and 212 indicate their presence is optional, although in one embodiment, at least one two-way communications device is always present.

Figure 3:
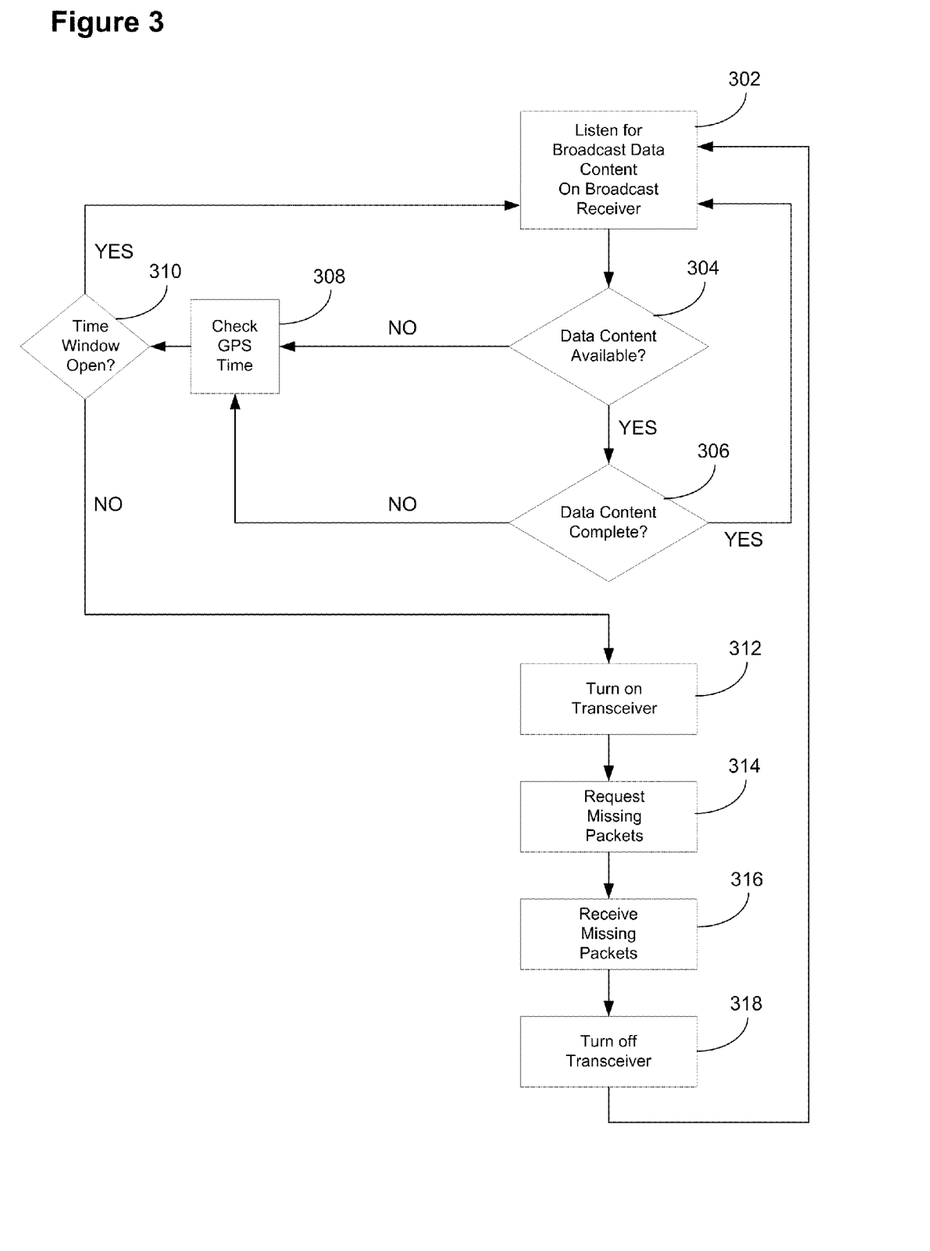
FIG. 3 is an exemplary algorithm showing how a Portable Electronic Device can conserve power consumption by selectively using a two-way communications path when a one-way path is insufficient to accurately receive data.

FIG. 3 is an exemplary algorithm showing how a Portable Electronic Device 200 can conserve power consumption by evaluating the content receiving status of the Device 200 downloaded via a one-way broadcast RF path and then if necessary taking appropriate action to utilize other communication paths. In this example, the Device 200 listens for data content on a Broadcast channel at block 302. In order to reduce power consumption, the Device 200 may monitor for data content only during predefined receive periods. If, at block 304, no content is received, then, at block 308, the CPU checks the internal GPS based clock to verify if the expected receive period is over. At block 310, if the expected receive period is still open, then control returns to block 302 and the Device 200 continues to listen on the Broadcast channel. If no data is received, and if the receive period is over then the 'no' branch from block 310 is taken to block 312. At block 312, the Device powers up a two-way communications transceiver, such as transceiver 208, and at block 314 requests that the data content be downloaded. The missing data is received at block 316 and the Device 200 to minimize power consumption turns off the transceiver at block 318.

Returning to block 304, if data content is available, the data content is received on the Broadcast channel. At block 306, after evaluating packet numbers and performing any error correction, the Device 200 verifies that the data content is complete and without errors. If so, control returns to block 302 and the Device 200 waits for the next receive period. If, at block 306, the data content is not complete, the Device checks if the receive period is still open at 308 and if so, returns to block 302 to attempt to complete the download. If, at block 306 the data is not complete or has uncorrectable errors and at block 308, the receive window is closed, then the 'no' branch from block 310 may be followed, and, as described above, the two-way transceiver may be turned on at block 312. Unlike the case above, where no content had been received and none of the packets of the data content had been received, this time at block 314 the Device 200 may only request those packets that were missing or uncorrectably corrupted from the original data content. After receiving the missing content on the two-way Communications path at block 316, the Device 200 powers off the two-way transceiver at block 318 and returns to monitoring the receive only Broadcast channel at block 302.

Figure 4:
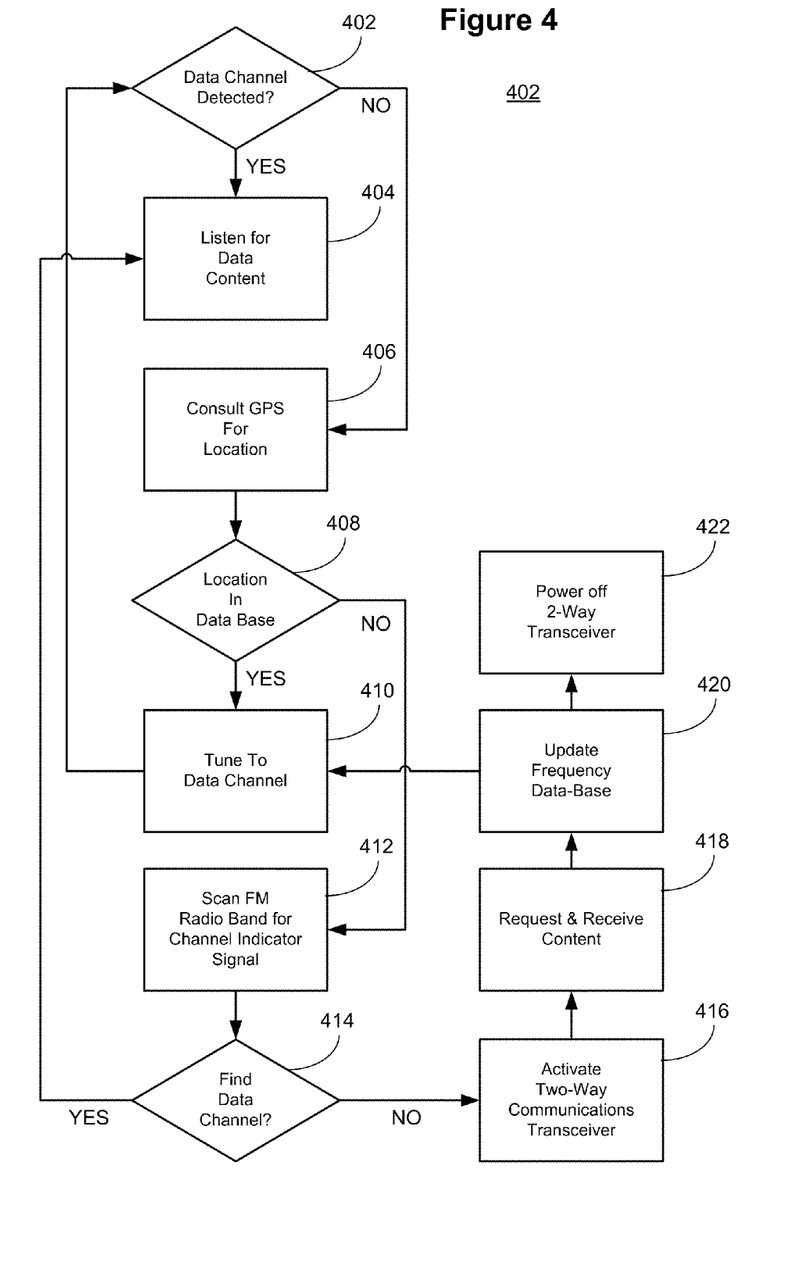
FIG. 4 is an exemplary algorithm showing how a Portable Electronic Device can locate the correct frequency on which to receive digital data content and if a one-way broadcast channel is unavailable then use a two-way communications path.

FIG. 4 is an exemplary algorithm 400 showing how a Portable Electronic Device 200 can locate the correct frequency on which to receive digital data content transmitted by a Broadcast backbone 106 while minimizing power consumption. In this example, at block 402, the Device 200 listens on the last-used radio frequency for a broadcast indicator that the current frequency channel is being used to broadcast digital data content. The broadcast indicator may be a pilot tone, a periodically broadcast data packet of known content, etc. If the Device 200 identifies the broadcast indicator, the 'yes' branch from block 402 may be taken to block 404 and the Device 200 continues to monitor that frequency for content. If, at block 402, the Device 200 does not receive the broadcast indicator (for example, if the Device 200 has been moved to a different city or the System has changed frequencies) then the 'no' branch from block 402 is taken to block 406 and the Device 200 consults a GPS receiver 206 to determine the current geographic location of the Device 200. At block 408, the Device 200, uses the current geographic location to consult an internal data base (lookup table) to determine the correct frequency. When the location look up returns a frequency, the 'yes' branch from block 408 is taken to block 410. The Device 200 retunes to the designated frequency and listens on the new channel for the indicator signal at block 402, as previously described. If, at block 408, the location is not in the look-up table then the 'no' branch from block 408 is taken to block 412 and at block 412 the Device 200 sequentially scans all frequencies known by the Device 200 as potential broadcast backbones. If, at block 414, a broadcast indicator is found, Device 200 may stay on that channel and the 'yes' branch from block 414 may be taken to block 402 to begin downloading digital content.

If, at block 414, no broadcast indicator signal is detected, then the 'no' branch from block 414 may be taken to block 416. At block 416 the Device 200 powers up a two-way transceiver, such as transceiver 208, 210 or 212 of FIG. 2 for an alternative, two-way, communications backbone. At block 418, the Device 200 may request that any current content or updates be downloaded and receive the requested content. In addition, the Device 200, at block 420, may download any updates to the location lookup table, and if a previously unidentified channel is indicated, the Device 200 may tune the broadcast receiver 204 to the correct broadcast backbone frequency at block 410. Operation may continue at block 401 using the broadcast backbone 106 of FIG. 1. Additionally at block 420, once the content and any updates are received over the two-way communications pathway, operation may continue at block 422 and the Device 200 to conserve battery life may power off the two-way transceiver.

Figure 5:
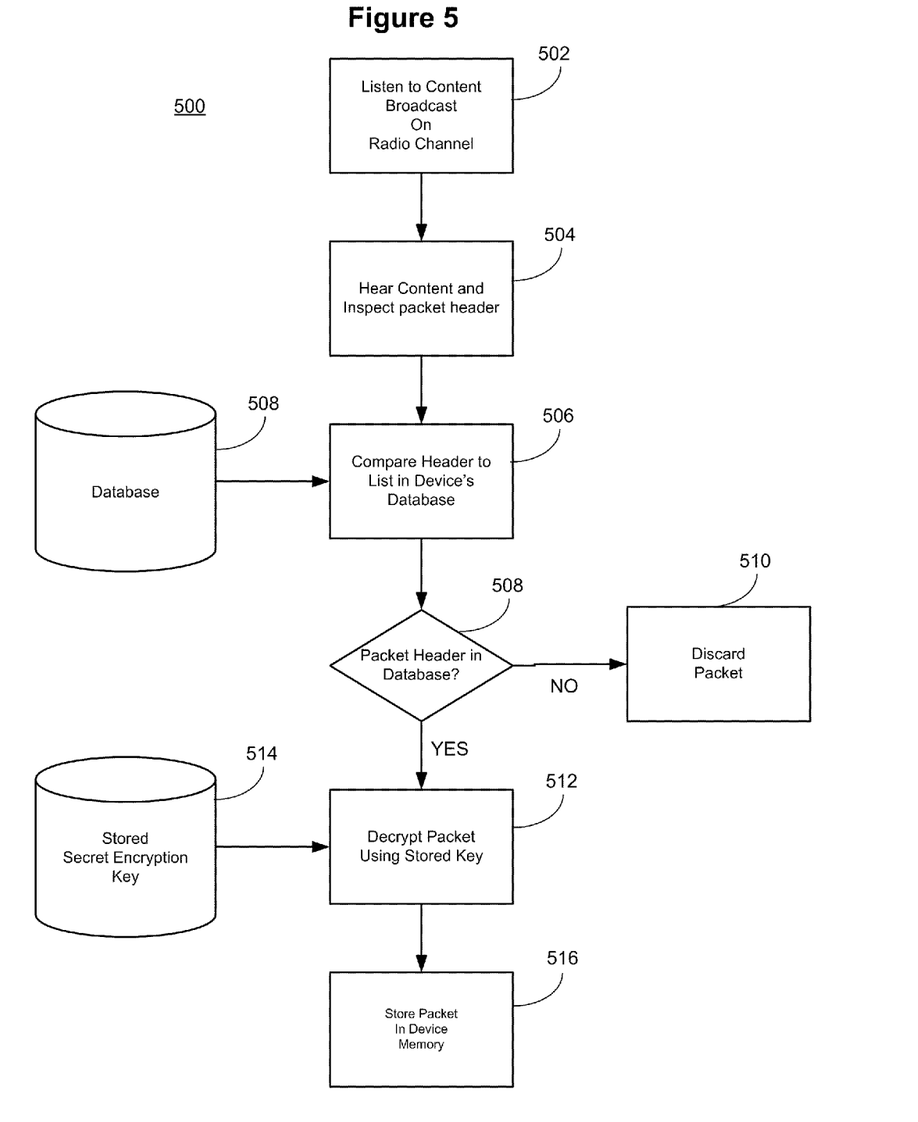
FIG. 5 is an exemplary algorithm of a method by which the Portable Electronic Device may utilize encryption to selectively receive data within a larger data stream and thus conserve battery and storage space and to provide secure authentication in a primarily one-way content delivery system.

FIG. 5 is an exemplary algorithm 500 depicting a method by which the Portable Electronic Device 200 conserves battery and storage space by selectively accepting, decrypting, and storing broadcast packets. In this example, at block 502, the Device 200 locates a channel from which to download digital content, as described above with respect to FIG. 4. At block 504, the Device 200 examines the headers of packets in the broadcast data stream and compares them at block 506 with a list of headers stored in the Device's database 508. If a header is included in the Device's database 508, the 'yes' branch from block 508 is taken to block 512. The database 508 may include header information corresponding to subscription content using header information that is supplied by a content or service provider. The database may also include header information corresponding to free or trial content selected and added to the database by a user. At block 512, the packet is downloaded and, if needed, decrypted using a key from the key database 514 (such as, in secure memory 231 of FIG. 2). The packet may then be stored in local memory of the Device 200 at block 516. If, at block 508, the header is not included in the Device's database 508, then the 'no' branch from block 508 may be taken to block 510. At block 510, the Device 200 may discard the copy of the header and does not store the associated packet in its memory. Quickly determining the appropriateness of the digital content in the packet and acting to save or discard it reduces the time that the transmitter is on and the time and battery energy required to write the digital content to a non-volatile memory, such as a flash memory. Doing so increases battery life while still providing full function to the user.

Alternatively, at block 506, each packet may be downloaded and stored temporarily in memory. If the header match is determined at block 508, the packet may be decrypted and stored as described above. If the header does not match, the entire packet may be discarded at block 510. In such an embodiment, the header may be sent in the clear while the payload may be encrypted.

Figure 6:
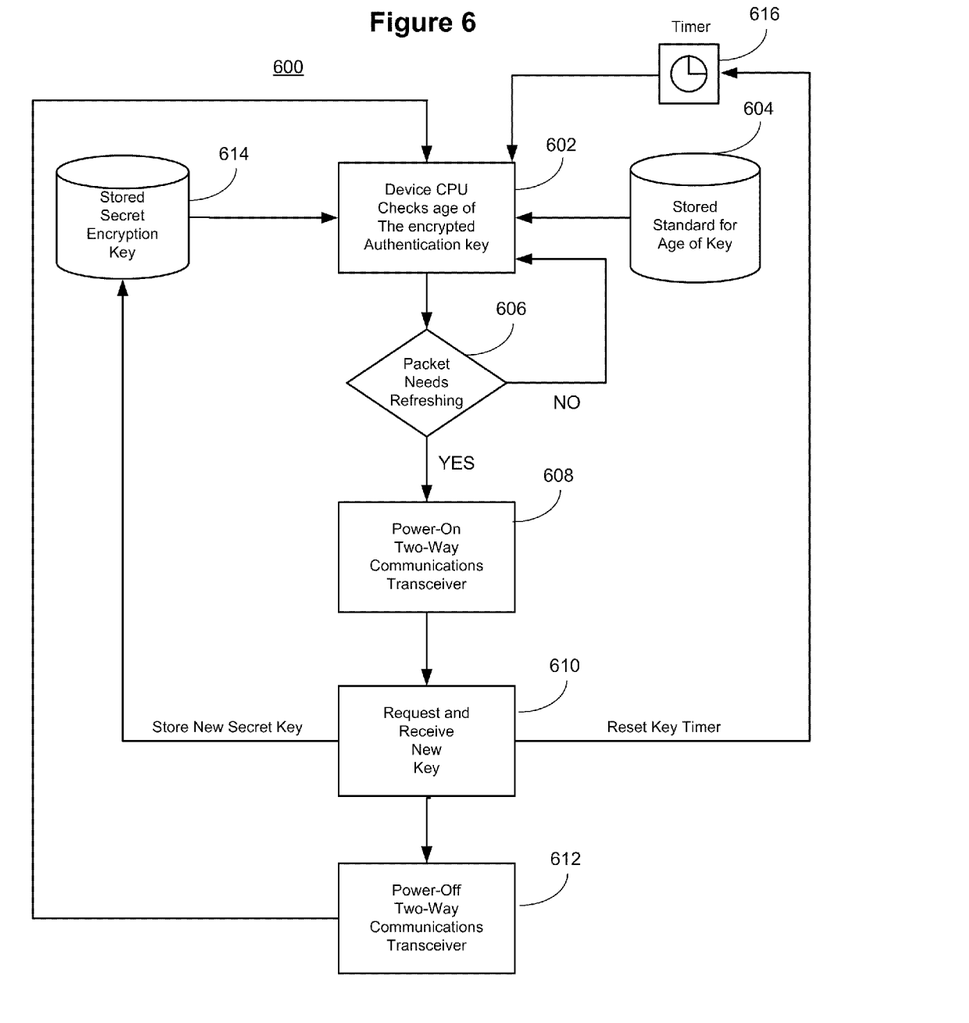
FIG. 6 is an exemplary algorithm of a method to update an encryption key while minimizing power consumption in a primarily one-way content delivery system.

FIG. 6, is an exemplary algorithm 600 of a lower power method for providing secure authentication in a primarily one-way content delivery system. In this example, the Portable Electronic Device 200 periodically updates the Device's secret key in accordance with instructions stored in the Device's memory 228. At block 602, the Device's CPU regularly executes these instructions, for example, once a day. At block 606, if it is determined that the key is still valid, for example, if the key timer 616 has not expired or a set date has not passed, the 'no' branch from block 606 may be taken and control returned to block 602. When, at block 606, the CPU determines that it is time to update the key, for example, if the key timer 616 has expired, the 'yes' branch from block 606 may be taken to block 608. At block 608, the Device 200 powers on the Device's two-way communications wireless transceiver, e.g. transceiver 208 of FIG. 2, and sends a message at block 610 to a System Server (not depicted) requesting a new key. The Device 200 and the Server securely negotiate this transaction and a new key is downloaded to the Device over the two-way communications link. After completing the new key download at block 610, the Device 200 may store the new key at block 614 in a secure memory 230, reset the Key timer 616 and, in order to conserve battery life, power off the two-way transceiver at block 612. The process 600 then starts again at block 602. Keys may be set to expire coincident with subscription expiration dates. Alternatively, keys may be set to expire based on another factor, such as the value of the downloaded data, or system preference settings related to battery life, etc.

In one embodiment, the key timer 616 or key expiration information may be checked each time the two-way transceiver is activated, for example, when downloading missing data. If a key update is due, the request may be appended to the data request to promote optimal use of the two-way network and conserve Device battery power.

Figure 7:
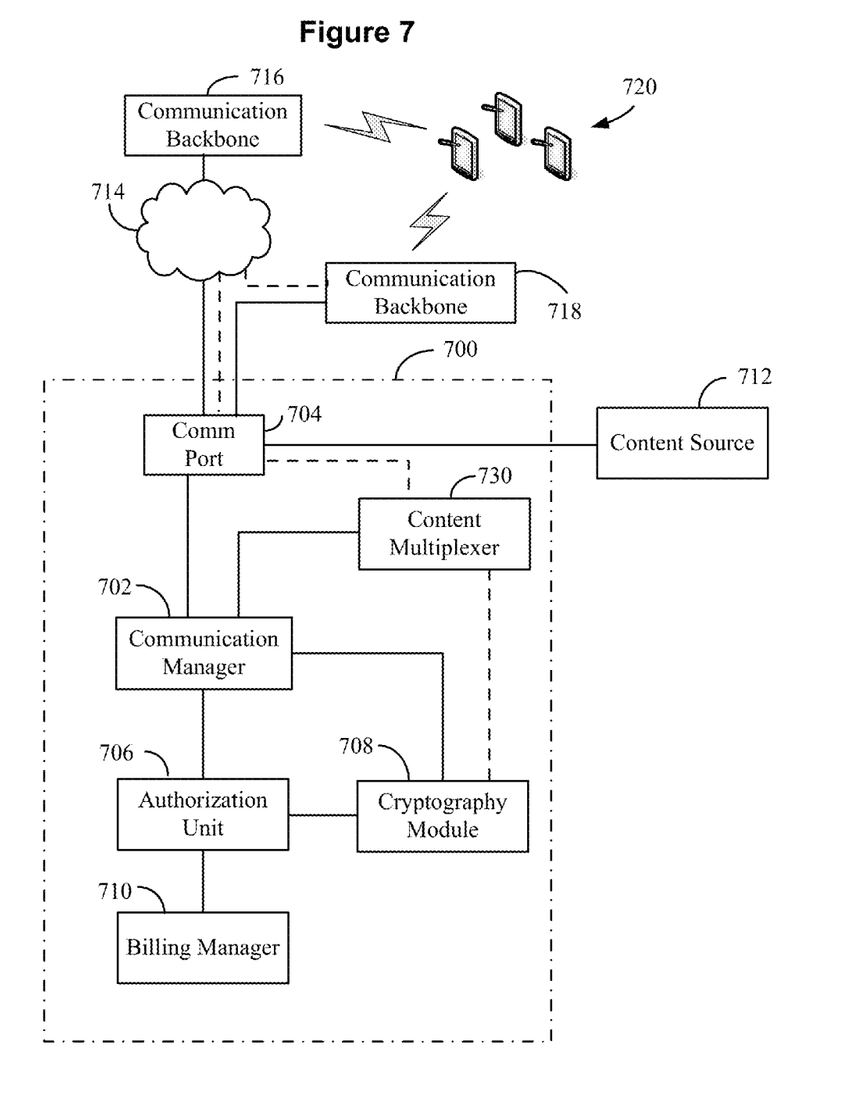
FIG. 7 is an exemplary block diagram of a data center of the data transmission system.

FIG. 7 illustrates an exemplary data center 700, such as data center 114 of FIG. 1. The data center 700 may coordinate content assembly, perform subscription management, and select backbone delivery alternatives for a plurality of portable electronic devices 720.

The data center 700 may include a communication manager 702 that sends and receives data via a communication port 704. An authorization unit 706 may determine both device and content subscription status based on information from a billing manager 710 or similar business operation. The authorization unit 706 may determine any special coding required for data intended for a particular portable electronic device or for individual device authorizations. The authorization unit may direct the cryptography module 708 to perform the actual cryptographic operations to secure individual digital data content or to generate temporary keys for use in portable electronic devices.

Digital content, such as multi-media content, e-books, newspapers, etc., may be received from one or more content sources 712. In some embodiments, the digital content may be directed to a content multiplexer 730 where, for example, regular broadcast programming may be combined with the documents for broadcasting over a one-way media outlet, such as a first communication backbone 718. In other embodiments, the digital content may be prepared and sent to the first communication backbone 718, where multiplexing of regular programming and the digital content may occur. In applications where the first communication backbone 718 is dedicated to content delivery, or where sub-carrier channels are used, no multiplexing may be required.

As described above, a second communication backbone 716 may support two-way communication and may be any of several two-way communications environments including a single system such as WiMax, or a combination of technologies such as Bluetooth and cellular data. Communications between the communications port 704 and the communication backbones 716 and 718 may be direct or may be through public or private networks 714, including the internet.

The communication manager 702 may receive and analyze requests from any of the plurality of portable electronic devices and determine a course of action. For example, a request to retransmit missing packets may be processed and responded to. Similarly, the communication manager may process key update requests in coordination with the authorization unit 706 and cryptography module 708. The communication manager 702 may maintain a master geographic database of broadcast backbones and channel access information (not depicted).

The communication manager 702 may also analyze requests for missing packets and/or missing content and alert local backbone managers of potential system errors. The same information may be used to determine when demographics favor adding a new broadcast backbone in a particular geographic region.

In the following description of an exemplary embodiment, the system may include the following components:

- A portable reading device (hereafter the "Device") displays newspaper or other content on a screen electronically. Said Device could be a general personal computer, tablet computer, netbook, cell phone or e-reader.
- An FM commercial broadcast radio station that, besides its normal commercial broadcasting functions, also broadcasts newspaper or other content to the Device. The broadcast system (hereafter the "Broadcast System") could also be a privately operated broadcast radio system that already exists or is established to support a particular content delivery need such as wireless communications in a remote location.
- Other two-way communication paths (hereafter "Two-Way Communications System") such as an 802.11g Wi-Fi® connection, Bluetooth® (802.15.1), WiMax™ (802.16), Zigbee® (802.15) or cellular network that provides an alternative communications path.
- Servers and other equipment in a data center to prepare and transmit content for transmission to the Device and in addition to control and manage the network and each Device's access to specific types or items of content.

Part I—Content Broadcast System

A. Description of the Broadcast System Physical Setup

A radio frequency communication system may be used to transmit information to an electronic device. Radio frequency communication systems may incorporate data transmission schemes that use a modulated signal including, but not limited to, analog transmissions such as AM radio, FM radio, analog television, etc., digital radio, digital television, cable television signals, optical transmissions, etc. Data may be broadcast over a particular radio frequency or channel. By way of example and not limitation, some transmission systems may use spread spectrum or frequency hopping systems, so the term radio frequency shall not limit its interpretation to a particular method of broadcast, but is merely used to designate a channel or other method for identifying one transmission signal from another.

In some embodiments, computer & communications equipment is placed at a broadcast location and connected both to the radio broadcast transmitter and to a data communications line that receives electronically formatted content (hereafter the "Content") from a remote location for broadcast to the Device(s). In these embodiments, the Content to be broadcast may be encrypted to both protect over the air eavesdropping and as part of the authentication system described below. Said computer and communications equipment then uses sub-carrier technology to code a data stream onto the broadcast radio transmitter's Subsidiary Communication Authorization (SCA), "sub-carrier" channels while regular radio programming is simultaneously broadcast on the main part of the radio broadcaster's designated bandwidth. This sub-carrier method of transmitting data has been widely used for example to broadcast Muzak™ content to department stores and is authorized by the FCC.

In an alternative configuration, the Content is broadcast using the entire assigned bandwidth of the Broadcast System to increase the amount of Content that can be wirelessly transmitted to the Device(s). In a third alternative, the Broadcast System multiplexes the Content with other low bandwidth audio content so that a human listening to the Broadcast System's channel can hear audio content but the bulk of the designated frequency bandwidth is used for Content distribution. In a fourth alternative which encompasses the previous three alternatives, the content is broadcast using digital, so called HD Digital Radio, radio transmit and receive equipment.

B. Description of the Device's Radio Content Receive System:

A radio receiver is placed inside a remotely located Device. Said Device contains a radio receiver that can receive, recognize and decode the FM SCA data stream content. The Device in addition to the above mentioned radio receiver also has a micro-processor (hereafter "CPU"). The CPU in this embodiment manages the identification, decryption, storage and retrieval of received content. In addition, the Device has a clock by which it is able to determine the date and time of day, a GPS receiver which it utilizes to calibrate its internal clock and to determine its location. The Device also contains a flash memory storage location where it can store and retrieve content received via the broadcast or other communications system. In a second alternative, the Device instead contains a radio receiver that receives the primary bandwidth of a broadcast radio channel and can decode data packets transmitted over that broadcast radio channel. In a third alternative implementation, the radio receiver of the second alternative implementation can separate out multiplexed data sent over the primary radio channel and send audio content to be played over a audio circuit and data Content to be processed, stored and displayed by the Device. In a fourth alternative implementation, the radio receiver is a digital radio receiver.

(2) Description of how the Device Finds the Correct Radio Frequency

In this preferred embodiment, the Device's CPU utilizes a look-up table to determine what frequency it should listen to receive content. The CPU consults the GPS derived location information, finds that location on the look-up table and then finds on the table the appropriate frequency for that location. An alternative implementation has the Device listening on the last utilized radio frequency and then, if it finds that said last utilized channel is not being utilized for content broadcasting (for example if the Device has moved to a different city), then the Device scans through the radio channels until it detects another radio channel that is being used to broadcast content.

C. Broadcast System Logical Description:

The Broadcast System in this embodiment sequentially wirelessly broadcasts the content of multiple different newspapers or other content to one or more remotely located mobile Device(s). The Device can be over the air programmed to receive the content of one or more of the newspapers or other content that is sequentially or concurrently broadcast by the Broadcast System. To enable the Device to determine what content to receive, a data header is broadcast at the beginning of each packet of content which identifies in code the content that is about to be broadcast (hereafter the "Identifier Code"). The Device is designed to detect this content Identifier Code and to compare it to internally stored instructions. If a Device determines that it is to receive the subsequent content, then the Device records the content to memory. If a Device determines that it is not to receive the subsequent content, then it ignores the subsequent content but continues to monitor the broadcast channel for a subsequent header that indicates additional authorized content is about to be broadcast and needs to be received and stored. This method minimizes battery consumption at the Device because the CPU only decrypts and processes relevant data. It also maximizes storage space by only recording content of interest. The Device also monitors for error correction and end of transmission codes. All data packets have message identifier codes and the CPU compares these with already received packets so redundant packets can be discarded.

The CPU also decrypts the received content, compares the message identifier codes with received data on the content packet structure to determine whether a complete set of packets has been received, verifies that there are no unfixable errors and assembles the packets together in order to reconstruct the received content. If content is missing then the CPU may cause the Device to listen for additional packets or may utilize an available Two-Way Communications Backbone System to request that the missing packets be transmitted down to the Device.

(2) Description of One-Way Encryption and Content Control System:

The encryption system may utilize an access control polynomial that requires each client to have a secret unique ID. This unique ID (the "secret key" of a two factor security system) is encrypted and embedded within the Device's semiconductor at the time of manufacture. Such an ID has to be issued only once and does not need to be changed, even if a Device's content access rights are changed by the content distribution system. The access polynomial embeds the secret decryption key to be distributed and the polynomial is constructed in such a way that only the intended recipients can extract the secret from it.

In an alternative implementation, a second code may be periodically downloaded to the Device. This second downloaded code may be combined with the permanent unique ID mentioned above to create a changeable secret key in order to reduce the complexity of the access polynomial in order to decrease the battery consumption of the CPU as it receives and decrypts the broadcast packets.

In a second alternative embodiment that further decreases the processing tasks and power consumption of the CPU, the content distribution system periodically updates the encryption key by utilizing a secure Two-Way Communications System. In this embodiment all content is encrypted and each Device has stored within its memory a key that enables it to decrypt the correct content using two factor encryption technology. This key is periodically updated as follows. In this alternative embodiment, the Device's CPU monitors the time that the encryption key was last updated and when the predetermined period for updating of the key occurs, the CPU causes a two-way alternative communications system to be activated and during this two-way session, the encryption key is updated in the Device. If a two-way communications link is being used for some other reason, then the CPU senses this and initiates a key update as a piggyback transaction. If a two-way link is not available when the key renewal time is approaching then the microprocessor displays a message on the Device's display requesting the user to connect the Device to the internet. Alternately, the System may utilize the broadcast content delivery system to instruct the Device to update its encryption key.

Part II—Hybrid Network Implementation

A. Physical Description of the Device's Hybrid Network System:

(1) Description of Transceivers in the Device

The Device also has one or more additional radio transceivers that support a Two-Way Communications System. These may include cellular, WiFi (802.11), WiMax (802.16), Bluetooth (802.15.1) or Zigbee (802.15) transceivers. For this implementation the system includes cellular, WiFi and Bluetooth transceivers. Said Two-Way Communications System transceivers in the device are normally turned off to conserve battery power and to minimize data charges on these point to point communications links.

(2) Description of Multi-Band Strip Antenna

To support multiple communications paths in a compact portable Device requires a compact, efficient and complex multi-band antenna system. In some embodiments the Device utilizes two miniaturized tunable microstrip antennas in order to cover the various bands utilized in a hybrid wireless system. To insure that interaction between these discrete antennas does not degrade performance, the two antennas are optimized in the Device as if they are a single unit.

B. Logical Description of Hybrid Network System:

Two-Way Communications System transceiver(s) are powered on for limited periods of time when the Broadcast System is not available or when a two-way communications path is required by the Device's internal logic or by the Device's user. Such reasons for utilizing a Two-Way Communications System are, among other reasons, as follows:

(1) Not Receiving Complete Broadcast Content

The Device in this implementation knows from its internal clock and GPS receiver, the time of day and has pre-programmed in its static memory the time periods during which content is broadcast over SCA channels. The Device's CPU monitors the time of day and when the CPU determines that the broadcast period is over and that the appropriate content has not yet been stored in the Device's memory, then the CPU activates one or more of the alternative Two-Way Communications System transceiver(s) and sends a message to the content distribution system's servers requesting that the server download the missing content either over the Broadcast System or over one of the available Two-Way Communications Systems. In this embodiment, the microprocessor prioritizes the use of the Broadcast System in order to minimize the use of a Device transmitter. Such prioritization of the Broadcast System lowers battery consumption and minimizes costly airtime charges.

(2) Receiving Location Specific Content

The Device in this implementation periodically monitors alternative wireless communications systems in order to either (i) detect the availability of alternative systems so that the setup time on said alternative system(s) can be minimized or (ii) to detect that location sensitive content is being made available to the Device. With regard to location sensitive content, the Device only listens for lower power location specific broadcasts such as from a Wi-Fi hotspot. In this implementation, the Device only powers up the receive side of the Device's Two-Way Communications System transceiver(s) in order to minimize battery consumption. The Device, once it hears a local system pilot tone, signal identification broadcast or other indication that there is location specific content available, then logs on and listens to that system location specific content. For example, location based or contextual advertising content. Once said location specific content is received, the Device to maximize battery life logs off and powers off the transceiver.

(3) Uploading Content to the System

In some circumstances, the Device may need to transmit as well as receive content. For example, the Device may need to upload error messages, the Device may need to update its encryption secret key, the Device may need to upload usage data for advertising, etc. or the user of the Device may wish at various points in time to transmit messages, upload content or browse the web. In some implementations, the CPU senses the need for a two-way communications link, determines the availability of a Two-Way Communications System, logs onto said system, uploads the data and then logs off of the alternative network thereby conserving battery in the Device and minimizing data costs.

Part III—Content Updating System Description

The disclosed device provides a method for updating the content of the newspaper or other content between daily downloading of a complete newspaper or other content. In some embodiments, updated content is broadcast during the day using the SCA broadcasting system or via other communications channels when the Device is connected to the internet. New content is formulated into articles (hereafter "Articles") which are tagged with specific space identifiers. The Device's microprocessor determines which space on the original newspaper is to be replaced and then replaces that content on the Device's display. A marker may be placed in the upper left hand corner of the new Article to indicate that the content has been updated. In addition, the user of the Device may touch said marker with a stylus and thereby cause the content to switch back to earlier content in a round-robin fashion. In addition, when new content takes less space than the previous content then pre-stored advertising content will be displayed in the remaining space. Also, when the new content requires more space than the original article, then the extra article content will be displayed in a new page at the end of the newspaper.

The system and methods described above provide a benefit to system operators, eBook distributors, portable electronic device manufacturers, and end users alike. The efficiency of using a one-way broadcast network to make content generally available provides a low-cost wide-area distribution channel for content. Supplementing the broadcast channel with two-way capability allows updates and missing information to be quickly supplied without incurring the overhead and cost of exclusive use of the two-way network. eBook providers see an increased distribution footprint while end users are given wide area, low cost access to content of all kinds while extending battery life.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method for selectively utilizing a two-way transceiver to augment a primary one-way broadcast receiver for downloading digital content to an electronic device, the method comprising:
   automatically locating, by a CPU in the electronic device, a broadcast radio frequency for use by the broadcast receiver to download digital content, wherein automatically locating the broadcast radio frequency comprises:
      automatically determining, by the CPU, the broadcast radio frequency by using GPS data to query a look-up table of broadcast radio frequencies;
   downloading, using the broadcast receiver, the digital content over the determined broadcast radio frequency, wherein the two-way transceiver is powered off to reduce device battery power consumption;
   determining, by the CPU, that some or all of the downloaded digital content was not correctly received by the broadcast receiver;
   in response to determining that some or all of the digital content was not correctly received, powering on, by the CPU, the two-way transceiver;
   downloading, using the two-way transceiver, the some or all of the digital content to remedy the incorrectly received digital content; and
   once the download is remedied, powering off, by the CPU, the two-way transceiver to further reduce device battery power consumption.

2. The method of claim 1, wherein determining that some or all of the digital content was not correctly received comprises at least one of:
   determining, by the CPU, that the digital content was not received in an expected time frame, and
   determining, by the CPU, that received digital content has missing or damaged elements.

3. The method of claim 1, wherein determining that some or all of the digital content was not correctly received comprises:
   utilizing, by the CPU, a time of day to determine that the digital content was not received in a designated time period.

4. The method of claim 1, further comprising:
   in response to determining that some or all of the digital content was not correctly received, sending a request to a provider of the digital content, via the two-way transceiver, requesting re-transmission of the digital content.

5. The method of claim 1, further comprising:
   providing, via the two-way transceiver, a supplementary communications link that allows two-way data communications from the electronic device.

6. The method of claim 5, further comprising:
   using, by the CPU, the supplementary communication link for at least one of a data transfer or web browsing.

7. The method of claim 1, further comprising:
   delaying, by the CPU, the downloading of the some or all of the remedial digital content until the two-way transceiver is in use for another purpose.

8. The method of claim 1, wherein the two-way transceiver is one of:
   a Wi-Fi (standard #802.11) transceiver, a Bluetooth (standard #802.15.1) transceiver, a WiMax (standard #802.16) transceiver, a Zigbee (standard #802.15) transceiver, and a cellular telephone data transceiver.

9. The method of claim 1, wherein receiving the digital content via the broadcast receiver comprises:
   monitoring, by the CPU, the determined broadcast frequency for transmissions of sequential and repeated broadcasts of the digital content; and
   automatically download, via the broadcast receiver, the digital content when in range of a broadcaster.

10. The method of claim 9, wherein monitoring the determined broadcast frequency for transmissions comprises:
    powering on, by the CPU, the broadcast receiver while a GPS time is within predefined receive period; and
    powering off, by the CPU, the broadcast receiver while the GPS time is outside of the predefined receive period.

11. The method of claim 1, further comprising:
    communicating, via the two-way transceiver, non-digital content related information, wherein the non-digital content related information includes at least one of electronic device status, electronic device errors, key updates, and usage data.

12. The method of claim 1, further comprising:
    uploading, via the two-way transceiver, at least one of advertising viewership data, a text message, an electronic mail, coupon usage data, a web browsing request, and an order for a product or services.

13. The method of claim 1, wherein downloading the digital content by using the broadcast receiver instead of the two-way transceiver comprises:
    reducing the monetary cost of downloading the digital content by utilizing, by the CPU, a less expensive channel of communication.

14. The method of claim 1, wherein querying the look-up table of broadcast radio frequencies comprises:
    comparing, by the CPU, a current GPS location of the electronic device to GPS values contained within the look-up table; and
    when the current GPS location matches a GPS value contained in the look-up table, determining, by the CPU, that a broadcast frequency corresponding to the current GPS value in the look-up table is the broadcast radio frequency for receiving digital data.

15. The method of claim 14, further comprising:
    when the current GPS location does not match a GPS value contained in the look-up table, automatically scanning, by the CPU, a plurality of radio channels to determine the broadcast radio frequency for receiving digital content.

* * * * *